July 4, 1961 H. W. BONNER 2,990,918
SPEED CONTROL FOR BAR MACHINES
Filed March 4, 1957
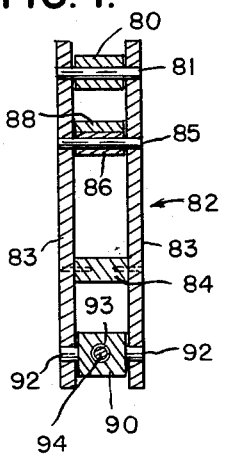
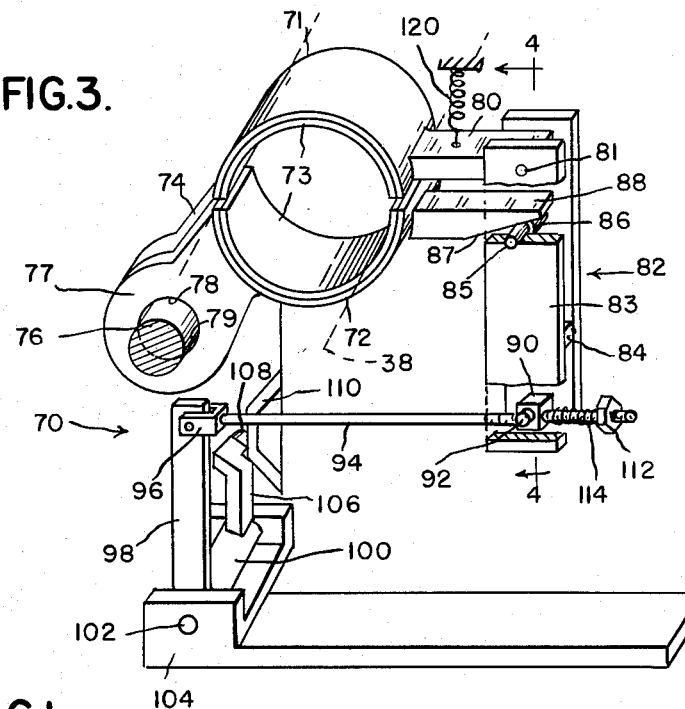
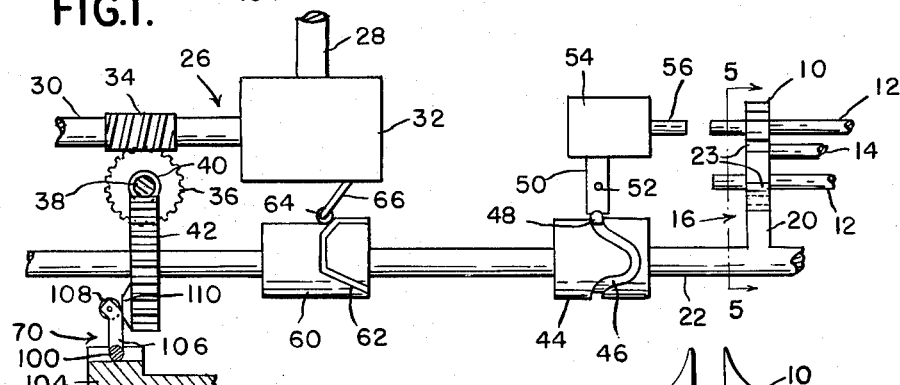
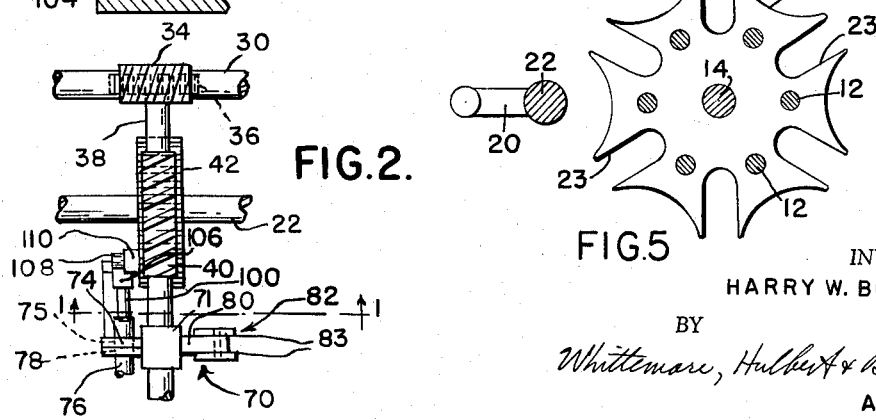
INVENTOR.
HARRY W. BONNER
BY
Whittemore, Hulbert & Belknap
ATTORNEYS

United States Patent Office 2,990,918
Patented July 4, 1961

2,990,918
SPEED CONTROL FOR BAR MACHINES
Harry W. Bonner, 449 Le Roy, Ferndale, Mich.
Filed Mar. 4, 1957, Ser. No. 643,659
5 Claims. (Cl. 188—75)

This invention relates to automatic bar machines and refers more particularly to brake mechanism for automatic bar machines.

In machines of this type, the tool slide is moved toward and away from the workpiece to perform a machining operation thereon. The movement of the tool slide may be considered to have, in its working cycle, a machining period and an idle period. The advance of the tool slide during the working period must be regulated in accordance with the particular machining operation involved so that the machining operation is carried out within the specifications required and also so that no damage results either to the workpiece or to the tool. It will be apparent that if the tool moves too rapidly during the machining period, the tool may be damaged and in addition, the machining operation may be below the required quality. During the idle period of the working cycle, that is, during the retraction movement of the tool slide and during its approach prior to the machining period, it is desirable to move the tool slide at a substantially increased rate of speed so as to reduce to a minimum the time of the idle period. Any reduction in the idle period will, of course, proportionately increase the productivity of the machine.

Accordingly a bar machine of this type ordinarily has provision for two speeds of tool slide movement, one relatively high speed for the idle period and one relatively low speed for the machining period. In order to further decrease the time of the idle period, it is desirable to provide brake mechanism for rapidly decreasing the speed of movement of the tool slide from the high speed idle period to the low speed machining period and it is for this purpose that the brake mechanism of the present invention is employed.

One object of this invention is to provide brake mechanism for an automatic bar machine which is extremely efficient in the performance of its intended function, composed of a relatively few simple parts, rugged and particularly characterized by its ability to stand up under long, continued use.

Other objects and features of the invention will become apparent as the description proceeds, especially when taken in conjunction with the accompanying drawing, illustrating a preferred embodiment of the invention, wherein:

FIG. 1 is a diagrammatic side elevational view of structure embodying the invention, on the line 1—1, FIG. 2.

FIG. 2 is a top plan view of portions of the structure shown in Fig. 1.

FIG. 3 is a perspective view of the brake mechanism.

FIG. 4 is a sectional view taken along the line 4—4 on FIG. 3.

FIG. 5 is a section on line 5—5 of FIG. 1.

Referring now more particularly to the drawings, the machine is diagrammatically illustrated and comprises a disc-like work carrier 10 having means for supporting a plurality of workpieces, in this instance bars indicated at 12. The bars are spaced from one another on a circle concentric with the axis of rotation of the carrier. The bars 12 are fed through the carrier 10 and gripped and clamped in position thereon by suitable devices not shown. The carrier is rotatable and supported on a shaft 14 and is adapted to be rotated by the Geneva mechanism 16. The carrier is the driven member of the Geneva mechanism and a driving member 20 is secured to the control shaft 22. The driving member 20 is in the form of an arm projecting radially outwardly from the shaft 22 having a part on the outer end engageable in suitable slots 23 in the carrier to index the carrier 10 through predetermined angular increments equal to the angular distance between the bars 12 carried thereby. The Geneva mechanism is only diagrammatically shown and is constructed in accordance with conventional practice.

The control shaft 22 is driven by a suitable motor not shown through the driving mechanism 26. This mechanism comprises a driving shaft 28 which drives the driven shaft 30 through a gear box 32. The gear box 32 houses suitable gear shifting mechanism for shifting the driving ratio between the shafts 28 and 30 to obtain high speed and low speed operation of the driven shaft. The driving shaft 28 is operated at a constant speed. The driven shaft 30 has a worm 34 secured thereon and in driving engagement with the worm wheel 36 on the shaft 38. The shaft 38 also has a worm 40 which meshes with and drives the worm wheel 42 secured to the control shaft 22.

A drum 44 is secured on shaft 22 and is formed with an annular cam track or groove 46 engaged by the follower 48 of the lever 50 supported on the machine by the fixed pivot 52. The lever 50 is connected to the tool slide 54 which is adapted to carry a tool 56. The tool slide 54 is positioned so that the tool 56 registers with one of the bars 12 in an indexed position of the carrier and the tool slide is reciprocated toward and away from the registering bar during rotation of the control shaft 22 by the cooperation between the cam track 46 and follower 48 to carry out a machine operation on the bar.

The control shaft 22 rotates one complete revolution for each complete working cycle of the machine. On the approach of the tool slide toward the registering bar 12, and before the tool 56 engages the bar, the speed of rotation of the control shaft 22 is reduced and continues to rotate at a reduced speed throughout the duration of the machining period. At the completion of the machining period, the tool slide 54 is retracted away from the bar 12 and at the instant the tool slide begins to retract, the shifting mechanism within the gear box 32 is shifted for high speed operation of the shaft 30 and hence the control shaft 22. The tool slide moves toward and away from the bar 12 once for each revolution of the control shaft 22.

The gear box shifting mechanism is controlled by the drum 60 secured to shaft 22. The drum 60 has a cam track 62 and a cam follower 64 carried by an arm 66 associated with the shifting mechanism within the gear box. The track 62 is arranged and constructed relative to the drum 44 to regulate the speed with respect to the position of the tool slide.

In order to reduce the speed of the control shaft from high speed to low speed quickly, the brake mechanism 70 is provided. The brake mechanism 70 comprises a pair of arcuate brakes shoes 71 and 72. The shoes 71 and 72 have brake lining 73 secured to the radially inner surfaces and the shoes are slightly less than 180° in extent. The shoes extend around opposite sides of the driven shaft 38 and embrace substantially 360° of the shaft. The upper shoe 71 has an arm 74 secured to one end which is formed with a cylindrical aperture 75 to receive the fixed cylindrical pivot 76. The lower brake shoe 72 has an arm 77 secured to one end. The arm 77 is also formed with a cylindrical aperture 78 which receives the pivot pin 76. The apertures in the arms 74 and 77 are slightly larger in diameter than the pivot pin 76 as indicated at 79 in FIGURE 3 to allow the shoes to position themselves with respect to the driven shaft 38 so that the brake lining is in full surface-to-surface contact with the shaft during the braking operation so that maximum braking effect can be obtained.

The other end of the upper shoe 71 has an arm 80 projecting therefrom and a pivot pin 81 is carried by the arm. A lever 82 is carried by the pivot 81. The lever 82 comprises a pair of plates 83 respectively pivoted to opposite ends of the pin 81 and rigidly secured together by a brace 84. A pin 85 is secured to and extends between the plates 83 and has roller 86 in the form of a sleeve loosely supported on the pin. The roller 86 is engageable with the tapered surface 87 of the arm 88 projecting from the lower shoe 72.

A block 90 between lower ends of the plates 83 has pins 92 at the opposite ends pivoted to the plates whereby the block is rotatable relative to the plates. The block has a transverse passage 93 through which loosely extends the connecting rod 94. The rod 94 has a yoke 96 at one end pivoted to an arm 98 which is carried by the tubular member 100. The tubular member 100 is supported on a pivot pin 102 which extends through the tubular member and is secured to the fixed supporting plate 104. The tubular member 100 is rotatable on the pivot pin and has a second arm 106 provided with a cam follower in the form of a roller 108 which is engageable with a cam 110 secured to the worm wheel 42.

The other end of the connecting rod 94 has a nut 112 threaded thereon. A compression coil spring 114 is compressed between the nut and the block 90.

The cam 110 is located on the worm wheel 42 in a position to engage the cam follower 108 at substantially the same instant that the shifting mechanism in the gear box 32 is shifted from high speed to low speed operation so that the transition from high speed to low speed is accomplished in the shortest possible time.

In operation, when the shifting mechanism within the gear box is shifted from high speed to low speed by the action of the cam track 62 and follower 64 (this occurs as the tool support moves toward the workpiece), the cam 110 engages the follower 108 to swing the arm 98 in a counterclockwise direction, thereby moving rod 94 to the left and swinging the lever 82 counterclockwise. Counterclockwise rotation of the lever about the axis of pin 81 causes the roller 86 to press up against the cam surface 87 thereby drawing the brake shoes together about the opposite sides of the driven shaft 38, quickly reducing its speed. The action of the brake shoes on the shaft is for only a short portion of the working or low speed period and occurs at the beginning of this period to quickly reduce the speed of the control shaft. Thereafter, the cam 110 passes the follower 108 to release the tension on the brake shoes. While the brake is actively engaged with the shaft, the pressure of the shoes upon the shaft is determined by the strength of the spring 114. The compression of the spring 114 may be varied by the nut 112.

When the spring is released, the lower shoe 72 drops by gravity away from the shaft and rests with the inclined surface 87 supported on the roller 86. The upper shoe is lifted clear of the shaft by the tension spring 120 secured to the upper shoe and to a fixed support on the machine.

The reduction in speed of the control shaft as the tool support moves toward the workpiece correspondingly reduces the rate of movement of the tool support so that neither the tool nor the workpiece is damaged during the machining operation. The high speed operation of the control shaft, which occurs during retraction of the tool support and initial advance toward the workpiece, produces a correspondingly high rate of movement of the tool support to reduce the idle period to a minimum.

What I claim as my invention is:

1. In a bar machine having a rotatable shaft, brake mechanism for said shaft including a pair of arcuate friction devices embracing said shaft for engagement therewith throughout substantially 360° of its circumference, pivot means including a pivot pin journaled in apertures in said friction devices having a diameter larger than the diameter of the pivot pin, said pivot means supporting one end of each friction device and providing for sufficient clearance for loose pivotal movement toward and away for said shaft, and means engageable with the other ends of said friction devices for moving the same about said pivot means including a lever pivoted to said other end of one of said friction devices and having a part engageable with said other end of the other friction device and operable to force said friction devices into engagement with said shaft upon pivotal movement of said lever in one direction, and means for moving said lever in said one direction including an actuator and an adjustable yielding connection between said actuator and lever.

2. In a bar machine having a rotatable shaft, brake mechanism for said shaft including a pair of arcuate friction devices embracing said shaft for engagement therewith throughout substantially 360° of its circumference, pivot means including a pivot pin journaled in apertures in said arcuate friction devices having a diameter larger than the diameter of the pivot pin, said pivot means supporting one end of each friction device and providing for sufficient clearance for eccentric pivotal movement toward and away from said shaft to enable said friction devices to automatically position themselves on said shaft in full surface to surface engagement therewith for maximum bearing effect, and means engageable with the other ends of said friction devices for moving the same about said pivot means including a lever pivoted at one end to said other end of one of said friction devices, said other end of the other friction device having a wedge shaped cam secured thereto, said lever having a roller secured between its ends engageable with said wedge shaped cam upon pivotal movement of said lever in one direction to force said friction devices into engagement with said shaft, and means for moving said lever in said one direction including an actuator connected to the opposite end of said lever.

3. In apparatus having a rotatable member, brake mechanism for said member including arcuate friction devices engageable with said member, pivot means supporting one end of each friction device for pivotal movement toward and away from said member, and means engageable with the other ends of said friction devices for moving the same about said pivot means, said pivot means including a pivot pin journaled in enlarged apertures in said friction devices having a diameter larger than the diameter of the pivot pin, said pivot means loosely supporting said one end of each friction device to provide sufficient clearance to enable said friction devices to automatically position themselves on said member in full surface-to-surface engagement therewith for maximum braking effect.

4. In a bar machine having a rotatable shaft, brake mechanism for said shaft including a pair of arcuate friction devices embracing said shaft for engagement therewith throughout substantially 360° of its circumference, pivot means including a pivot pin journaled in apertures in said arcuate friction devices having a diameter larger than the diameter of the pivot pin, said pivot means supporting one end of each friction device and providing for sufficient clearance for eccentric pivotal movement toward and away from said shaft to enable said friction devices to automatically position themselves on said shaft in full surface to surface engagement therewith for maximum bearing effect, and means secured to the other ends of said friction devices for moving the same about said pivot means including a first rigid arm rigidly attached to the other end of one of said friction devices and a rigid wedge shaped arm rigidly attached to the other end of the other of said friction devices in spaced relation to said first rigid arm, and also including a lever comprising a pair of spaced apart side plates rigidly secured together by a centrally disposed brace, a roller journaled between said side plates centrally of the two ends thereof and pivot connection means at both ends of said lever, said lever being pivotally connected at one end to said first rigid arm with said roller disposed to engage said wedge shaped arm on pivotal movement of said lever about said first rigid arm in one direction to force said friction devices into engagement with said shaft, and means for moving said lever in said one direction including an actuator connected to the opposite end of said lever.

5. An apparatus having a rotatable member, brake mechanism for said member including friction devices embracing said member for engagement therewith, pivot means supporting one end of each friction device for pivotal movement toward and away from said member, means for moving said friction devices into engagement with said member including a cam surface on the other end of one of said friction devices and a lever pivoted at one end to the other end of the other of said friction devices having a part between its ends engageable with said cam surface to force said friction devices toward one another and into engagement with said member upon pivotal movement of said lever in one direction, and means attached to the other end of said lever for pivoting said lever in said one direction.

References Cited in the file of this patent

UNITED STATES PATENTS

| | | |
|---|---|---|
| 125,158 | Yarrell | Apr. 2, 1872 |
| 474,051 | Woodhead et al. | May 3, 1892 |
| 925,304 | Cummings | June 15, 1909 |
| 1,110,011 | Schneider | Sept. 8, 1914 |
| 1,528,841 | Myers | Mar. 10, 1925 |
| 1,727,781 | Neal | Sept. 10, 1929 |
| 1,902,230 | Gunderson | Mar. 21, 1933 |
| 1,976,406 | McGiffert et al. | Oct. 9, 1934 |
| 2,149,940 | Kylin | Mar. 7, 1939 |
| 2,481,153 | Robichaud | Sept. 6, 1949 |
| 2,534,993 | Robichaud | Dec. 19, 1950 |
| 2,614,663 | Joseph | Oct. 21, 1952 |
| 2,660,264 | Richardson | Nov. 24, 1953 |